US009903514B2

(12) United States Patent
Böttcher et al.

(10) Patent No.: US 9,903,514 B2
(45) Date of Patent: Feb. 27, 2018

(54) PIPE CONNECTION FOR CONDUCTING A PRESSURIZED FLUID

(71) Applicant: Siemens Aktiengesellschaft, Munich (DE)

(72) Inventors: Andreas Böttcher, Mettmann (DE); Tobias Krieger, Oberhausen (DE); Patrick Lapp, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 34 days.

(21) Appl. No.: 14/903,959

(22) PCT Filed: Jun. 25, 2014

(86) PCT No.: PCT/EP2014/063394
§ 371 (c)(1),
(2) Date: Jan. 8, 2016

(87) PCT Pub. No.: WO2015/007483
PCT Pub. Date: Jan. 22, 2015

(65) Prior Publication Data
US 2016/0169424 A1    Jun. 16, 2016

(30) Foreign Application Priority Data
Jul. 15, 2013 (EP) .................... 13176514

(51) Int. Cl.
*F16L 51/00* (2006.01)
*F16L 19/025* (2006.01)
*F16L 59/18* (2006.01)

(52) U.S. Cl.
CPC ............. *F16L 19/025* (2013.01); *F16L 51/00* (2013.01); *F16L 59/181* (2013.01)

(58) Field of Classification Search
CPC ....... F16L 19/025; F16L 19/06; F16L 19/062; F16L 59/181; F16L 51/00; F16L 39/005
(Continued)

(56) References Cited
U.S. PATENT DOCUMENTS 168,597 A * 10/1875 Atwood ................ F16B 39/286
                                                    411/280
818,584 A *  4/1906 Treatt .................... F16B 39/12
                                                    411/222
(Continued)

FOREIGN PATENT DOCUMENTS

CA    2008892 A    8/1990
CN    2158480 Y    3/1994
(Continued)

OTHER PUBLICATIONS

CN Office Action dated Jul. 29, 2016, for CN application No. 201480040166.4.
(Continued)

*Primary Examiner* — David E Bochna
*Assistant Examiner* — James A Linford
(74) *Attorney, Agent, or Firm* — Beusse Wolter Sanks & Maire

(57) ABSTRACT

A pipe connection that includes two tubular connection pieces for a conical clamping connection, the connection pieces being screwed together by a union nut while one connection piece is plugged inside the other. Each connection piece has a conical sealing surface which sealingly rests against the other, and an annular groove is provided in one of the sealing surfaces. The union nut is slit on the collar side.

9 Claims, 2 Drawing Sheets

(58) Field of Classification Search
USPC .................................... 411/917, 935, 937
See application file for complete search history.

(56) References Cited

U.S. PATENT DOCUMENTS

| | | | | |
|---|---|---|---|---|
| 2,289,309 A | * | 7/1942 | Winkle, Jr. | ........... F16B 39/286 |
| | | | | 411/280 |
| 2,299,209 A | * | 10/1942 | Brackett | ............... F16B 39/286 |
| | | | | 411/280 |
| 2,393,520 A | * | 1/1946 | Crowther | ................ F16B 39/38 |
| | | | | 411/276 |
| 4,508,374 A | | 4/1985 | Kantor | |
| 5,192,095 A | | 3/1993 | Behrens | |
| 2002/0190523 A1 | | 12/2002 | Berghaus | |
| 2011/0227337 A1 | | 9/2011 | Kattler et al. | |

FOREIGN PATENT DOCUMENTS

| | | | |
|---|---|---|---|
| CN | 101046267 A | 10/2007 | |
| DE | 1960933 U | 5/1967 | |
| DE | 2631984 A1 * | 1/1978 | ............ F16L 27/047 |
| DE | 2845854 A1 * | 4/1980 | ............ F16L 19/025 |
| DE | 3743170 C1 * | 5/1989 | ............ F16L 19/005 |
| DE | 9015457 U1 | 4/1991 | |
| DE | 9106441 U1 * | 8/1991 | .......... F16L 19/0218 |
| DE | 9200051 U1 * | 3/1992 | ............ F16L 19/062 |
| DE | 19859422 A1 | 7/2000 | |
| EP | 380970 A2 | 8/1990 | |
| JP | S6012150 U | 1/1985 | |
| JP | S61129991 U | 8/1986 | |
| JP | H02292595 A | 12/1990 | |
| JP | H05118479 A | 5/1993 | |
| JP | H0712274 A | 1/1995 | |
| JP | H11153290 A | 6/1999 | |

OTHER PUBLICATIONS

JP Office Action dated Dec. 19, 2016, for JP patent application No. 2016-526489.

\* cited by examiner

PIPE CONNECTION FOR CONDUCTING A PRESSURIZED FLUID

CROSS REFERENCE TO RELATED APPLICATIONS

This application is the US National Stage of International Application No. PCT/EP2014/063394 filed 25 Jun. 2014, and claims the benefit thereof. The International Application claims the benefit of European Application No. EP13176514 filed 15 Jul. 2013. All of the applications are incorporated by reference herein in their entirety.

FIELD OF INVENTION

The invention relates to a pipe connection for conducting a pressurized fluid, comprising two tubular connection pieces which are screwed together by a union nut in the manner of a conical clamping connection with one plugged into the other, wherein each connection piece has a conical sealing surface which bears in a sealing manner against the other of the two sealing surfaces.

BACKGROUND OF INVENTION

Pipe connections mentioned at the beginning are known very well from the prior art. For example, DE 1 960 933 U discloses a connection piece as part of such a pipe connection, said connection piece being able to be welded to a pipe end. The known connection piece is in this case plugged into an at least partially complementary connection piece, wherein the two connection pieces are screwed together by way of a union nut. In this case, the conical sealing surfaces are pressed against one another, with the result that a leaktight pipe connection is produced. The pipe connection is used at least for conducting hydraulic oil. However, it has been shown that such connections can become untight when fluids having a varying or different temperature are conducted, for example when converting from a gaseous or liquid fuel to a line flushing medium.

SUMMARY OF INVENTION

It is therefore an object of the invention to provide a pipe connection for conducting a pressurized fluid, said pipe connection being permanently reliably leaktight in spite of the conduction of fluids with a changing temperature.

This object underlying the invention is achieved by a pipe connection which corresponds to the features of the independent claim. Advantageous developments of the pipe connections are specified in the dependent claims, the features of which can be combined with one another as desired.

According to aspects of the invention, provision is made of a pipe connection for conducting a pressurized fluid, comprising two tubular connection pieces which are screwed together by a union nut in the manner of a conical clamping connection with one plugged into the other, wherein each connection piece has a conical sealing surface which bears in each case against the other of the two sealing surfaces, wherein the union nut comprises a tubular portion which at least partially has an internal thread for screwing the union nut on a first tubular connection piece, and a collar, arranged at one end of the tubular portion, for axially clamping a tubular second connection piece to the first connection piece, and wherein the collar has a number of slits distributed around its circumference.

In other words, provision is made for the union nut of the pipe connection—in order to screw the union nut on a first tubular connection piece—to have a tubular portion which at least partially has an internal thread and—in order to axially clamp a tubular second connection piece to the first connection piece—comprises a collar arranged at one end of the portion, wherein the collar has a number of slits distributed around its circumference, said slits segmenting the collar.

The invention is based on the finding that, in the case of pipe connections secured by union nuts, with a varying temperature of the fluid or in the event of a fluid change, where the fluids have different temperatures, the connection piece located on the inside reacts thermally more quickly than the outer of the two connection pieces. This can have the result that, with dropping temperature gradients, the cone of the inner sealing surface shrinks more quickly than the cone of the outer sealing surface, with the result that, on the one hand, leaks can occur and, on the other hand, the breakaway torque of the union nut can decrease.

Consequently, the inventors have found that previous pipe connections with conventional union nuts are very inelastic, such that in the union nut, only very few thread turns, down to one thread turn, effects the entire clamping of the pipe connection. In order therefore to make it even more difficult to release the union nut, an elastic design of the closure means is required. In order to ensure this, for the first time a union nut, the collar of which is slit, is proposed. The collar is in this case that component of the union nut by means of which, when the union nut is screwed on the first connection piece of the pipe connection, the second connection piece is pushed in the direction of the first connection piece.

As a result of the slitting of the collar, the union nut according to the invention behaves similarly to an expansion screw in a screwed connection, that is to say like a pretensioned tension spring. The new property of the union nut—the elastic resilience—is brought about in this case by the segments which result from the slitting and which are also designated clamping hooks in the following text. The use thereof prevents changes in length during operation of the pipe connection—for example as a result of changes in temperature—causing great force changes in the connection, which could allow the connection to be released. Calculations have shown that, when the temperature of the medium conducted through the pipe connection changes, the breakaway torque of the previous screwed connection could be more than doubled, with the result that even when vibrations occur in the pipe connection according to the invention, said pipe connection can permanently maintain its leaktightness.

The clamping hooks which are produced by the slitting of the collar ensure, by way of their resilient, elastic action, that, when the screwed connection contracts, the press fit of the seal seat is retained and drops less greatly compared with the conventional embodiment when, on account of temperature fluctuations, some components of the pipe connection cool down or heat up more quickly than other components of the pipe connection. As a result of the use of the union nut according to the invention in the pipe connection, the pretension generated during the fitting of the pipe connection drops less greatly during said operation. The pipe connection according to the invention also provides the advantage of resisting rapid changes in load, known as alternating stress, and any load shocks by way of the now possible expansion. A particular advantage of the pipe connection according to the invention is that, in the event of retrofitting of an existing pipe connection, all that is necessary is to replace the union nut and the other components of the pipe connection can continue to be used unchanged. It has furthermore been shown that, as a result of the significant increase in the breakaway torque, the proposed pipe connection can manage even without an additional anti-rotation device, for example a lock nut; it is therefore self-locking. Furthermore, the structurally simple solution can likewise be produced easily, thereby reducing costs.

That end of the slits that is remote from the collar is advantageously designed in a round manner, in order to reduce stresses, for example notch stress in the case of slits that end in a rectangle. Instead of this or as an alternative, relief bores could also be provided.

It should be noted that the terms "axial" and "radial" and "internal" and "external" always relate to the axis of symmetry of the pipe connection along which the pipes extend and along which the medium conducted by the pipe connection flows.

According to a first advantageous configuration, the slots have such an axial extent that they extend into the tubular portion. Therefore, the clamping hooks have in principle two legs, wherein the first leg is formed by the collar and the second leg extends parallel to the axial extent of the slits. In other words: the clamping hooks are in principle L-shaped, wherein one of the two legs of the L-shaped clamping hook merges into the tubular portion. With the aid of this configuration, the elasticity of the union nut can be established particularly easily. In addition, the required elasticity of the individual clamping hooks is ensured in those regions of the union nut in which the clamping hooks merge into the unslit tubular portion. This reduces the mechanical load on the union nut with greater elasticity compared with those union nuts in which only the collar is slit.

According to a further advantageous configuration, the union nut has an axial extent as a whole, wherein the slits extend to the middle of the axial extent of the union nut. As a result, a residual tubular portion which is unslit remains, and the internal thread is provided on the internal surface thereof in order to screw the union nut onto one of the two tubular connection pieces. The integrity of the screwed connection in the region of the internal thread is thus not impaired by the slits. Advantageously, the spacing between the internal thread and the slit ends is about 2 mm.

By way of the invention, in particular the existing conical clamping connections are enhanced so as to also conduct fluids—gaseous or liquid—in the stationary or transient state, wherein the temperature difference between the fluid and the environment can either be very different or fluctuate. For example, it is now also possible to use the pipe connection at very high ambient temperatures. In the case of pipe connections in fuel lines of stationary gas turbines, the ambient temperatures can be up to ~420° C. and fluid temperatures of about 20° C. occur (or even 230° C. in the case of fuel preheating). This results in a temperature difference of 400 K or 190 K in stationary operation. In the transient case, for example when the pipe connection has been heated up and is not conducting any fluid and the fluid supply occurs, or when the environment and thus also the pipe connection heat up to a stationary temperature and the comparatively cold fluid flows through the line, there occurs a different temporally delimited expansion of the connection pieces, the secure connection of which by the union nut can be ensured even for the heating-up time of the environment, which experience has shown can last about 200 seconds.

Overall, the invention specifies a pipe connection for conducting a pressurized fluid, comprising two tubular connection pieces for a conical clamping connection, which are screwed together by a union nut with one plugged into the other, wherein each connection piece has a conical sealing surface which bears in a sealing manner against the other. In order to provide a leaktight and reliable pipe connection even for conducting a fluid with a changing or varying temperature, it is proposed that the union nut is slit on the collar side.

BRIEF DESCRIPTION OF THE DRAWINGS

Further advantages and features of the invention are explained in more detail by way of an exemplary embodiment. In the drawing.

DETAILED DESCRIPTION OF INVENTION

In all of the figures, identical features are provided with the same reference signs.

Figure 1:
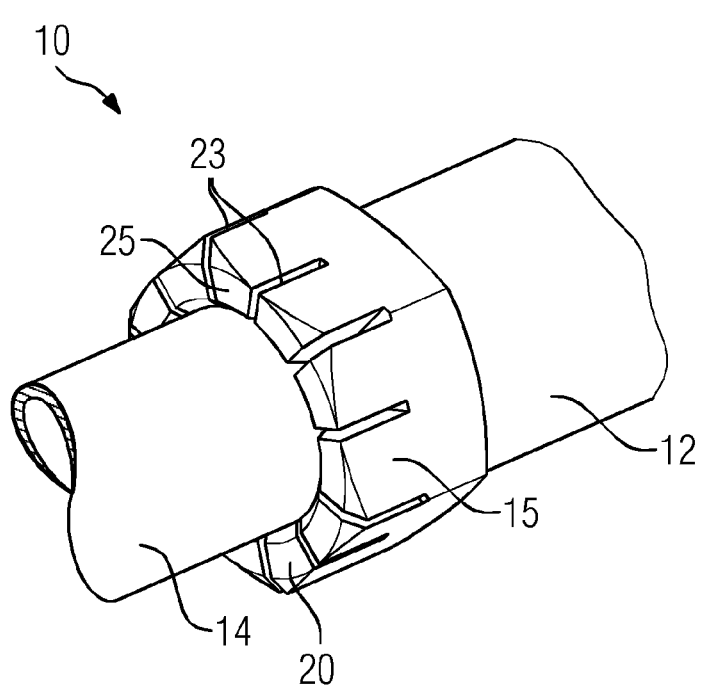
FIG. 1 shows a perspective illustration of a pipe connection for conducting a pressurized fluid, having an axially partially slit union nut.

FIG. 1 shows a perspective illustration of a pipe connection 10 for conducting a pressurized fluid. The pipe connection 10 connects two tubular connection pieces 12, 14 releasably together. The pipe connection 10 has a union nut 15 as releasable element. In the exemplary embodiment shown, the union nut 15 is equipped with an external hex. At an axial end, the union nut 15 has a collar 20 typical therefor. Compared with conventional union nuts, the union nut 15 according to the invention has slits 23 which subdivide at least the collar 20, but advantageously also a part of the collarless axial portion of the union nut 15 into clamping hooks 25 in a segment-like manner. In the exemplary embodiment shown, provision is made of a total of twelve clamping hooks 25 and thus twelve slits 23, of which in each case six slits 23 are arranged at the corners of the hex and in each case six slits 23 are arranged at the planar surfaces arranged in between. The slits 23 do not in this case extend along the entire axial length A (FIG. 2) of the union nut 15, but only approximately half way from the collar-side end. Depending on the requirements, a smaller or greater number of clamping hooks 25 and slits 23 can also be provided.

Figures 2, 3:
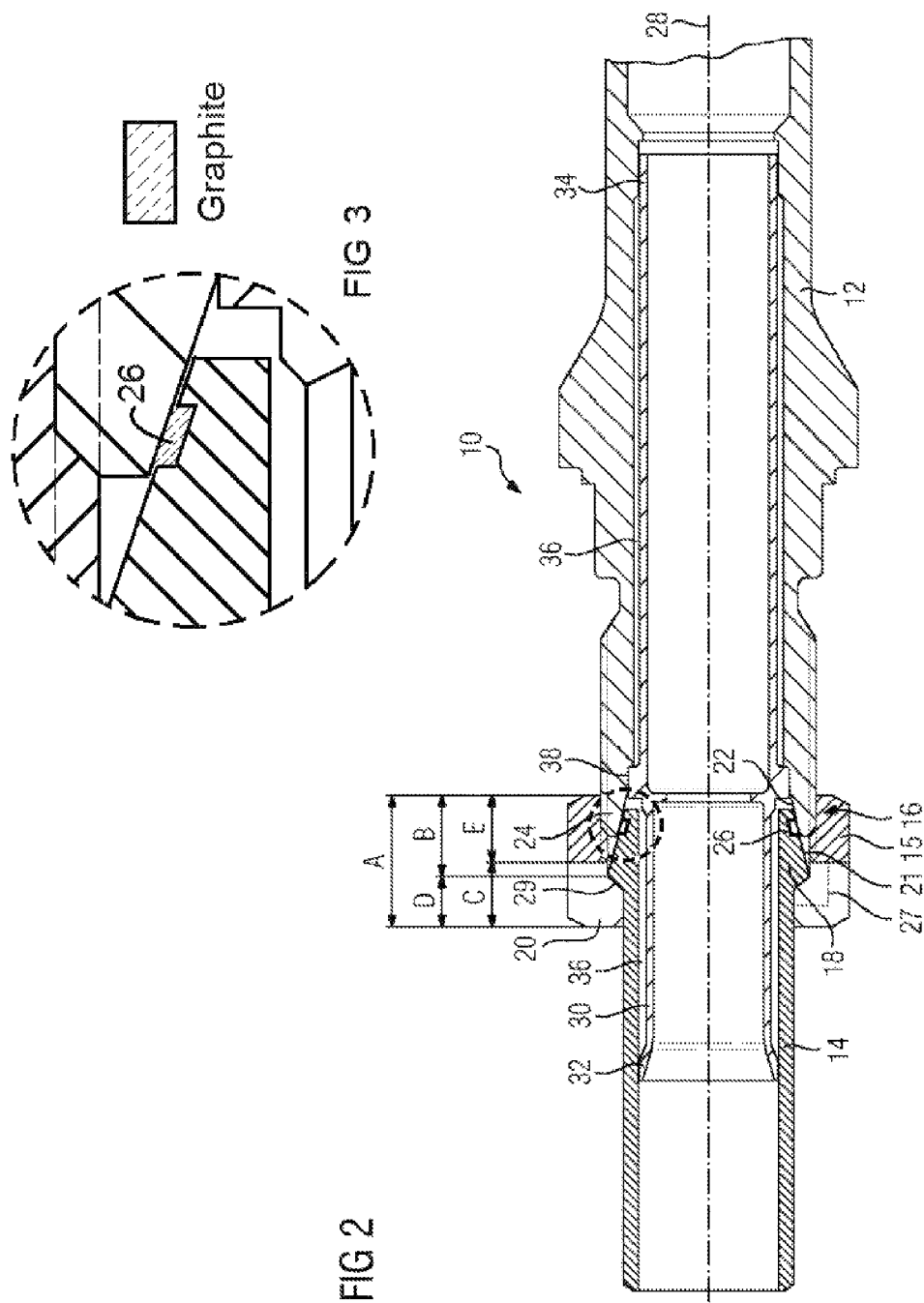
FIG. 2 shows the longitudinal section through the pipe connection having the union nut according to the invention according to FIG. 1.
FIG. 3 shows an enlarged view of the circled area of FIG. 2.

FIG. 2 shows a longitudinal section through the pipe connection 10 for conducting a pressurized fluid. The tubular connection pieces 12, 14, which are configured for a conical clamping connection 16, extend along an axis of symmetry 28 of the pipe connection 18. The second connection piece 14 to this end has a cone 18 having an outwardly directed conical sealing surface 21. At an inclination corresponding to the sealing surface 21, the first connection piece 12 has a likewise conical sealing surface 22, as part of a cone 24. The cone 24 forms the external cone and the cone 18 the internal cone of the conical clamping connection 16.

Provided in the sealing surface 21 is an endlessly circumferential annular groove 26 for holding graphite (not shown in FIG. 2) as sealant. The two connection pieces 12, 14 are connected together with the aid of the union nut 15. Specifically, the union nut 15 has been screwed onto the first connection piece 12, wherein the union nut 15 presses, with its collar 20, a conical shaft flange 29, as rear part of the cone 18 of the second connection piece 14, in the direction of the first connection piece 12. The two connection pieces 12, 14 are configured in a tubular manner such that the fluid, for example a hydraulic oil or a gaseous or liquid fuel, can be transferred in the interior thereof.

Specifically, the union nut 15 has an overall axial length which is designated A below. Within the meaning of this patent application, the union nut 15 can theoretically be subdivided into a tubular portion B, which is adjoined by the collar portion D. In the collar portion D, the inside diameter of the union nut 15 is reduced, thereby resulting in the shoulder-shaped collar 20 by way of which the shaft flange 29 of the second tubular connection piece 14 can be clamped. The slits 23 that segment the collar 20 have an axial slit length C starting from the collar-side end, wherein, in the exemplary embodiment shown, the axial slit length C has been selected such that the slits 23 extend into the tubular portion B of the union nut 15. This results in a screw-connection portion E which is adjoined monolithically by the in principle L-shaped clamping hooks 25. Depending on the selected tightening torque of the union nut 15, it is possible, on account of the slits, for the clamping hooks 19 to be pushed slightly outwards on account of the conical shaft flange 29, with the result that elastic pretensioning can be introduced into the pipe connection 10. Outwardly pushed, that is to say slightly fanned clamping hooks 25 are not illustrated in FIG. 2.

The L-shaped design 27 of the clamping hooks 25 is schematically indicated in the lower part of the sectional illustration of the union nut 15 by way of dotted lines.

Arranged in the interior of the pipe connection 10 is a thermally insulating tube 30. The thermally insulating tube 30 is arranged at least in that axial portion of the pipe connection 10 against which the internally located connection piece—in this case the connection piece 14—bears by way of its sealing surface 21 against the other sealing surface 22. However, according to the exemplary embodiment, the thermally insulating tube is axially extended in both directions, wherein the ends 32, 34 of the thermally insulating tube 30 bear as far as possible in a sealing manner against the internal surfaces of the connection pieces 12, 14, such that flowing of the fluid into an intermediate space 36 between the thermally insulating tube 30 and the internal surfaces of the connection pieces 12, 14 is avoided. In addition, a flange 38, which is fixed axially between the two connection pieces 12, 14, is provided on the external lateral surface of the thermally insulating tube 30.

Instead of a thermally insulating tube 30, it is of course also possible to apply a thermally insulating layer to the internal surfaces of the pipe connection 10, which were previously in direct contact with the fluid to be conducted in the prior art, in order to retard the heat transfer between the pipe material or cone material and the fluid in the event of a change in the fluid temperature. This also contributes to improved leaktightness of the pipe connection 10 and to an increase in the breakaway torque of the union nut 15.

FIG. 3 shows an enlarged view of the circled area of FIG. 2. Graphite can be seen disposed in the annular groove 26.

The invention claimed is:

1. A pipe connection for conducting a pressurized fluid, comprising:
two tubular connection pieces which are screwed together by a union nut in a conical clamping connection with one plugged into the other,
wherein each connection piece has a conical sealing surface which bears in each case against the other of the two conical sealing surfaces,
wherein the union nut comprises a tubular portion which at least partially has an internal thread for screwing the union nut on a first connection piece of the two tubular connection pieces, and a collar, arranged at one end of the tubular portion, for axially clamping a second connection piece of the two tubular connection pieces to the first connection piece, wherein the collar has a number of slits distributed around its circumference, and wherein the number of slits form an annular array of axially projecting clamping hooks, and
an insulating tube arranged in an interior formed by the two tubular connection pieces and comprising a first end sealed against an inner surface of the first connection piece, a second end sealed against an inner surface of the second connection piece, and a flange abutting the inner surface of the first connection piece at a respective conical sealing surface of the first connection piece,
wherein an outer surface of the insulating tube is spaced apart from the first connection piece and the second connection piece, forming a gap therebetween, the gap thermally isolating an interface of the two conical sealing surfaces from the insulating tube.

2. The pipe connection as claimed in claim 1, wherein in the union nut the number of slits have a slit length that is measurable in an axial direction and that the number of slits extend into the tubular portion.

3. The pipe connection as claimed in claim 1, wherein the union nut has an overall axial length and the slits extend as far as a middle of the overall axial length.

4. The pipe connection as claimed in claim 1, wherein the second connection piece comprises a flange, wherein the clamping hooks clamp on the flange to urge the conical sealing surfaces together.

5. The pipe connection as claimed in claim 4, wherein radially inner surfaces of the clamping hooks cooperate to form a first ramp, wherein the flange comprises a ramped outer surface configured to form a second ramp, wherein the first ramp and the second ramp cooperate so a radial clamping force exerted by the clamping hooks produces axial force that urges the conical sealing surfaces together.

6. The pipe connection as claimed in claim 4, further comprising a monolithic body comprising the second connection piece and the flange.

7. The pipe connection as claimed in claim 1, wherein one of the conical sealing surfaces comprises an outward conical sealing surface and the other of the conical sealing surfaces comprises an inward conical sealing surface, wherein the outward conical sealing surface comprises an annular groove recessed therein that is suitable for holding graphite therein and also for holding the graphite in a sealing manner against the inward conical sealing surface.

8. The pipe connection as claimed in claim 1, wherein the clamping hooks are configured to flex radially outward when the union nut is turned after the conical sealing surfaces seat on each other.

9. The pipe connection as claimed in claim 1, wherein an interference between the flange and the inner surface of the first connection piece prevents axial movement of the insulating tube.

* * * * *